United States Patent [19]

Teranishi et al.

[11] 4,364,862

[45] Dec. 21, 1982

[54] METHOD FOR PREPARING FIBROUS PROTEIN PRODUCTS

[75] Inventors: Susumu Teranishi; Yōichi Kawasaki, both of Osaka; Tsutomu Katayama, Izumisano; Hitoshi Taniguchi, Osaka, all of Japan

[73] Assignee: Fuji Oil Company, Limited, Osaka, Japan

[21] Appl. No.: 302,352

[22] Filed: Sep. 15, 1981

[30] Foreign Application Priority Data

Sep. 22, 1980 [JP] Japan .............................. 55-132077

[51] Int. Cl.³ .......................... A23J 1/14; C07G 7/00
[52] U.S. Cl. .............................. 260/112 R; 260/123.5; 426/656
[58] Field of Search ........................ 260/112 R, 123.5

[56] References Cited

U.S. PATENT DOCUMENTS

| | | | |
|---|---|---|---|
| 3,662,671 | 5/1972 | Frederiksen et al. | 260/112 R X |
| 3,662,672 | 5/1972 | Hoer | 260/112 R X |
| 4,017,646 | 4/1977 | Hoer et al. | 426/656 X |
| 4,197,327 | 4/1980 | Kawasaki et al. | 426/656 X |

*Primary Examiner*—Howard E. Schain
*Attorney, Agent, or Firm*—Wenderoth, Lind & Ponack

[57] ABSTRACT

The preparation of a fibrous protein product is carried out by heating a slurry of protein material under pressure and expelling the same through an orifice while it is fluidized. The orifice used has an inner diameter within the range of 2.5 to 10 mm over the length of 15 mm or more.

2 Claims, No Drawings

METHOD FOR PREPARING FIBROUS PROTEIN PRODUCTS

BACKGROUND OF THE INVENTION

The present invention relates to a method for preparing a fibrous protein product.

The preparation of a fibrous protein product by heating a slurry of protein under pressure to let the same flow through a back-pressure generating orifice is well known in the art from numerous publications, for example, U.S. Pat. Nos. 3,662,671 and 3,662,672. The back-pressure generating orifice used in this prior art method is of a type having a relatively narrow opening, for example, having an internal diameter of not more than 1 mm and, therefore, the resultant protein product is in the form of extremely slender protein filaments. Since these slender protein filaments are so randomly oriented and so discontinuous that they can hardly be bundled into a tow, the fibrous protein product so formed according to the prior art method is extremely slender and short of a pleasing sensation to the mouth, as compared with minced meat. In view of this, the fibrous protein product according to the above described method is usually used in the form of a lump of slender protein filaments or in the form as dispersed in a molded material.

A method similar to that described above, but wherein the discharge of the treated protein slurry is carried out by means of atomization so that the resultant fine protein fibers can be dexterously intertwined to form a meat-like lump of fibers is disclosed in, for example, Japanese Laid-open Patent Publication No. 54-44064 (corresponding to U.S. Pat. No. 4,197,327). According to this method, even though it is successful in the manufacture of the lump of protein fibers, the resultant protein product lacks both the outer appearance and the mouthfeel similar to those afforded by the minced meat itself.

SUMMARY OF THE INVENTION

During series of research activities we have done to develop a technique to make a fibrous protein product of a type having both a thickness and a taste similar to those of a cooked minced meat, we have found that the increased inner diameter of the orifice is apt to result in random formation of fine fibers of protein so far from the preparation of bold fibers of protein and that the bold fibers of protein can successfully be prepared by the employment of the orifice so designed as to have the increased inner diameter over a predetermined length or more.

Knowing that the bold fibers of protein tend to hamper a smooth passage through the throat and also to hamper a penetration of a flavoring agent, which might be applied thereto after fiber formation, with consequent reduction in taste-sustaining power, we have also found that these disadvantageous possibilities can substantially be eliminated by dispersing and mixing in the protein slurry an emulsion containing both of the oil and water phases, the external phase of which is the oil phase.

The present invention is based on the above described findings and is featured in that, in the practice of the method wherein a slurry of protein is heated under pressure and is, then, while fluidized, expelled through a back-pressure generating orifice to form a fibrous protein product, the orifice having an inner diameter of 2.5 mm or more, preferably within the range of 2.5 to 10.0 mm, over a length of 15 mm or more is employed. The present invention is also featured in that the protein slurry contains an emulsion dispersed and mixed therein, said emulsion containing oil and water phases and having its external phase in the form of the oil phase.

DETAILED DESCRIPTION OF THE INVENTION

These and other objects and features of the present invention will become apparent from the following description taken in connection with a preferred embodiment thereof.

As hereinbefore discussed, the method wherein a slurry of protein is heated under pressure and is, then, while fluidized, expelled through a back-pressure generating orifice is well known in the art. This will hereinafter be described in more detail as applied to the present invention.

A proteinaceous material for the protein slurry may be an oilseed protein derived from soybeans, cotton seeds or peanuts, or a milk protein, with or without one or a combination of meat protein, microbial protein and wheat protein added thereto. The concentration of the solid contents in the slurry is within the range of 5 to 35 wt %, preferably within the range of 15 to 30 wt % and more preferably within the range of 25 to 30 wt %. The pH value of the slurry should be such that the protein can readily precipitate at ambient temperature and is of a value approximating to the isoelectric point for the protein, preferably of a value equal to or slightly higher than the isoelectric point. By way of example, the pH value of the slurry should be within the range of 4 to 6, preferably within the range of 4.5 to 5.5 in the case of the soy protein. In the case where the slurry contains a metal salt, such as calcium or magnesium, or a hydroxide, cross-linkage of protein moleculars can be facilitated to such an extent as to result in ready precipitation of protein fibers, and therefore, a relatively wide range can be employed.

The protein slurry may be mixed with one or a combination of edible oil and fat, sugar, emulsifier, phosphate, flavoring agent and spice. However, according to a preferred embodiment of the present invention, the addition of an emulsion containing oil and water phase and having its external phase in the form of the oil phase to the protein slurry is preferred.

Examples of the emulsion containing both the oil and water phases, the external phase of which is the oil phase, include so-called water-in-oil type (W/o type) and oil-in-water-in-oil type (o/w/o type), both being stable at ambient temperature. A method for the preparation of these emulsion including selection and use of an emulsifying agent is well known to those skilled in the margarine manufacturing art. This known emulsion making method can be employed to manufacture the emulsion utilizeable in the practice of the present invention without the utmost care required in connection with such methodical conditions as SFI(solid fat content index) of oil and fat, ratio between the oil and water phases and necessity of cooling operation, since no strict adjustment of the viscosity or plasticity is required so much as in the margarine making method. In general, the emulsion utilizeable in the practice of the present invention can be prepared by mixing either the water phase, or the O/W type emulsion which has previously been prepared, with the oil phase melted at ambient or heated temperature and then emulsifying the mixture in the presence of an emulsifier. In order for the emulsified product to retain an stable emulsified state at ambient temperature, it is a technically easy way to prepare the emulsion to be non-fluidizing at ambient temperature and, in addition, the emulsion should preferably be plastic so that the product can give a pleasant mouthfeel. These physical properties of the emulsion are related largely to the melting point of the oil phase and, thereof, can be imparted if the melting point of the oil phase is higher than the ambient temperature and lower than about 45° C. The ratio of the oil and water phases is somewhat affected by the selection of the emulsifier and is preferably such that the amount of the oil phase is 35% or more by weight relative to the total weight of the oil and water phases. By so selecting the ratio, emulsification can readily be achieved. The emulsifier utilizeable in the practice of the present invention may be lecithin, monoglyceride, sugar ester or any other emulsifier used in the prior art, and the emulsification can be carried out by the use of any one of known homogenizing machines, some of which are known as "Votator," "Kombinator," "Perfecter" and "Onrator."

The addition of the flavoring agent to the emulsion is carried out during the preparation of such emulsion. The flavoring agent which may be used may be one or a combination of an extract of any of animal meats, an extract of any of fish meats, a hydrolysate of protein, a chemical additive, a reaction product of amino-carbonyl, and a sugar.

The amount of the emulsion to be added to the protein slurry is within the range of 5 to 50 wt %, preferably within the range of 15 to 30 wt % relative to the solid content of the protein in the slurry. If the amount of the emulsion is smaller than the lowermost limit, the taste-sustaining power of the resultant product will be reduced and, if it is larger than the uppermost limit, fibrillation will not be achieved with no difficulty.

According to the present invention, because the external phase of the emulsion used is the oil phase, not only is there no possibility that the smooth passage of the resultant bold protein fibers through the throat is hampered, but also any possible loss of the flavoring agent added prior to the fibrillation can be minimized and, moreover, because the flavoring agent is contained in the water phase contained internally of the oil phase of the emulsion, the resultant product can exhibit a taste-sustaining power for a prolonged period of time during chewing or mastification. However, this should not be construed as excluding the possibility of adding an oil-soluble flavoring agent to the oil phase, the possibility of adding an extra flavoring agent to the aqueous slurry or paste of protein, and the possibility of adjusting the flavor of the fibers subsequent to the formation into such fibers. By way of example, when a relatively small amount of the extra flavoring agent is added to the protein material separately of the addition of the same or different flavoring agent to the emulsion, the extra flavoring agent so added serves to compensate for a delay effect of the flavoring agent used in the water phase of the emulsion which would work out upon chewing. If the flavoring agents added to the emulsion and the protein material, respectively, are different from each other, a pleasing and sophisticated taste different from that given by the single flavoring agent can be appreciated.

The protein slurry mixed with the emulsion with or without one or some of the additives added is subsequently heated under pressure and, while allowed to flow, discharged through the back-pressure generating orifice, thereby forming protein fibers.

The pressure is of such a value sufficient to produce a back pressure of at least 10 kg/cm$^2$G or higher while the temperature is within the range of 105° to 160° C., preferably not higher than 140° C. If the pressure and the temperature are lower than the above described respective range, and if the slurry is not allowed to flow prior to the arrival thereof at the orifice, the passage of the slurry through the orifice does not readily result in the desired texture of protein fibers. If the temperature is higher than the uppermost limit, the protein will excessively heated, resulting in deterioration thereof.

As hereinbefore described, the present invention is featured in the employment of the orifice so designed as to have an inner diameter equal to or larger than 2.5 mm, preferably within the range of 2.5 mm to 10.0 mm, over the length of 15 mm or more. By the employment of the orifice of this particular design, the fibrous protein product having a thickness substantially equal to or slightly larger than the inner diameter of the orifice can be obtained. It is to be noted that, even if the orifice satisfies the requirement of the inner diameter, failure of the orifice to satisfy the requirement of the length will result in the production of fine protein fibers or a mixture of a large amount of fine protein fibers with a small amount of bold protein fibers. The orifice of the particular design satisfying the both of the requirements may have a somewhat tapering shape, but should not be so shaped as to discharge the treated slurry in an atomized condition because the atomized condition does not result in the production of the bold protein fibers. Usually, the larger the inner diameter of the orifice, the larger the length over which the orifice of the predetermined inner diameter runs. However, the length of 50 mm may be considered a maximum value in view of the fact that the larger length may require the application of the higher pressure which is difficult to handle. The cross-sectional shape of the orifice is usually circular, but it may be rectangular or any other slightly flattened shape if the surface area of the cross-section of the orifice remains the same as that of the circular-sectioned orifice.

It is to be noted that, where the orifice of 5 mm or more in inner diameter is to be employed, the inner diameter of a fluidizing passage leading to the orifice should be of a value equal to or larger than 1.2 times the inner diameter of the orifice used. Of course the cross-section area of the (one or more) orifice(s) is smaller than that of the flowing passage leading to the orifice, and in this invention the former is less smaller 0.7 times of the latter.

The protein fibers as discharged from the orifice may be dehydrated and neutralized if so desired and, thereafter, cut into pieces or seasoned. In particular, a technique of neutralizing the discharged protein fibers is disclosed in U.S. Pat. No. 4,017,646 (corresponding to Japanese Laid-open Patent Publication No. 52-72854 published in 1977). It is to be noted that the dehydration may be generally be omitted if the content of the solids in the slurry is larger than about 25 wt %.

The resultant protein fibers so prepared according to the present invention can give a mouthfeel similar to that afforded by a cooked minced meat. Even though the protein fibers of the present invention are bold, there is no possibility of the smooth passage thereof through the throat being hampered when the emulsion having its external phase in the form of the oil phase has been used in admixture with the protein slurry. Moreover, if the emulsion contains the flavoring agent in its internal phase, the protein fibers of the present invention can exhibit an excellent taste-sustaining power during chewing or mastication.

However, the present invention will be described in more detail by way of illustrative examples.

EXAMPLE I

A warm W/O type emulsion prepared from 15 parts of refined palm oil, 6 parts of water-soluble powdery flavoring agent, 0.18 part of emulsifier and 6 parts of water was dispersed in and mixed with 400 parts of acid precipitated curd (Solid content: 25 wt %, pH: 5.0), prepared from low denatured defatted soybeans, together with 3.2 parts of the same water-soluble flavoring agent and 0.83 part of coloring agent. The resultant mixture was then supplied under pressure (Orifice back pressure: about 50 Kg/cm$^2$G) to a heat-exchanger piping (Inner diameter: 5.2 mm, Length: 50 m) wherein the mixture is heated to the temperature of 130° C. and was passed continuously through the orifice having an inner diameter of 4.0 mm over the length of 30 mm. The result was that the protein fibers, about 5 mm in thickness, could be obtained.

COMPARISON I

The same mixture as in Example I was processed in the same manner as in Example I, except that a nozzle having an inner diameter of 4.0 mm over the length of 6.0 mm was used. The result was that very fine protein fibers were discharged from the nozzle in a scattered manner so far from the production of the thick protein fibers.

EXAMPLE II

The same mixture as in Example I was processed in the same manner as in Example I except that a nozzle having an inner diameter of 2.8 mm over the length of 30 mm was used. The result was that the protein fibers, about 3.0 mm in thickness, could be obtained.

COMPARISON II

The same mixture as in Example I was processed in the same manner as in Example I, except that a nozzle having an inner diameter of 2.8 mm over the length of 6 mm was used. The result was the production of the fine protein fibers mixed with a small amount of protein fibers, about 2 mm in thickness.

EXAMPLE III

The same materials as the materials for the emulsion in Example I were, without being emulsified, dispersed in and mixed with the same slurry as in Example I. The mixture was then processed in the same manner as in Example I. The result was substantially the same as in Example I.

EXAMPLE IV

Except that the same materials as the materials for the emulsion in Example I were not added to the slurry and that a soy protein having a solid content of 28 wt % was used, the same process as in Example I was carried out. The result was substantially the same as in Example I.

Each sample of the respective protein products according to Example I, Example III and Comparison IV was, after having been neutralized to 6.5 in pH value and then cut into 1.5 cm in length, submitted to the organoleptic test. The result of such test is tabulated below.

TABLE

|  | Taste-sustaining Power | Extent of Smooth Passage Through Throat |
|---|---|---|
| Example I | Excellent | Excellent |
| Example III | Slightly bad | Good |
| Example IV | (not Evaluated) | Inferior |

EXAMPLE V

Using the same materials and the same processes as in Example I, III and IV, respectively, except that the protein fibers discharged from the orifice were neutralized to 6.5 in pH value by continuously spraying an alkaline solution (an aqueous solution of 13% sodium carbonate onto threads of protein material being discharged from the orifice), the fibrous protein products were prepared. All of the products have shown a smooth outer appearance with no fuzz and exhibited an improved smooth passage through the throat as compared with the products of Examples I, III and IV.

EXAMPLE VI

35 Parts of pork paste (Solid content: 28.6 wt %), 15 parts of refined palm oil, 5 parts of water-soluble flavoring agent and 0.2 part of coloring agent were dispersed in and mixed with 360 parts of the same curd as in Example I. The resultant mixture was then supplied under pressure (Orifice back pressure: about 50 Kg/cm$^2$G) to a heat-exchanger piping (Inner diameter: 8 mm, Length 50 m) and was, after having been heated (135° C.), passed continuously through the orifice having an inner diameter of 6.0 mm over the length of 40 mm. The result was that the fibrous protein product, about 7 mm in thickness, could be obtained.

EXAMPLE VII

The same process as in Example I, except that the heating temperature inside the heat-exchanger piping was adjusted to about 145° C., was repeated 7 times. Supposedly because of variation of various parameters, the fibrous protein product having a thickness within the range of about 4 to 5 mm could be obtained only at one time and very fine fibrous protein products were obtained at the remaining times. This means that the method of the present invention can not fully satisfactorily be performed at such a high temperature range.

EXAMPLE VIII

The same mixture as in Example I was processed in the same manner as in Example I except that the inner diameter of the heat-exchanger piping was 4.0 mm over the entire length thereof with no orifice used. The result was that fine protein fibers were discharged from the nozzle in a scattered manner so far from the production of the thick protein fibers.

Although the present invention has been described in connection with the illustrative examples thereof, it should be noted that various changer and modifications are apparent to those skilled in the art. Such changes and modifications are to be understood as included within the true scope of the present invention unless they depart therefrom.

We claim:

1. A method for the preparation of a fibrous protein product which comprises the step of heating a slurry of protein material under pressure and expelling the slurry through a back-pressure generating orifice while it is fluidized, said orifice having an inner diameter equal to or larger than 2.5 mm and not larger than 10.0 mm over the length of 15 mm or more.

2. A method as claimed in claim 1, further comprising the step of adding to the slurry, an emulsion containing oil and water phases and having its external phase represented by the oil phase.

* * * * *